United States Patent
Hattori

(10) Patent No.: US 9,739,338 B2
(45) Date of Patent: Aug. 22, 2017

(54) VIBRATION- DAMPING SUPPORT DEVICE

(71) Applicant: SUMITOMO RIKO COMPANY LIMITED, Komaki-shi, Aichi (JP)

(72) Inventor: Masaya Hattori, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 15/004,003

(22) Filed: Jan. 22, 2016

(65) Prior Publication Data

US 2016/0138673 A1 May 19, 2016

Related U.S. Application Data

(63) Continuation of application No. PCT/JP2014/062922, filed on May 15, 2014.

(51) Int. Cl.
*F16M 1/00* (2006.01)
*F16F 15/08* (2006.01)
(Continued)

(52) U.S. Cl.
CPC .......... *F16F 15/08* (2013.01); *B62D 33/0604* (2013.01); *F16F 3/0873* (2013.01); *F16M 13/02* (2013.01)

(58) Field of Classification Search
CPC . F16F 15/08; F16F 1/37; F16F 3/0873; B62D 27/04; B62D 33/0604; F16M 7/00; F16M 13/02
(Continued)

(56) References Cited

U.S. PATENT DOCUMENTS 5,743,509 A * 4/1998 Kanda ................. F16F 1/38
248/634
6,523,817 B1 * 2/2003 Landry, Jr. .............. F16F 15/08
267/141.2
(Continued)

FOREIGN PATENT DOCUMENTS

JP 40-23050 Y 8/1965
JP H05-89987 U 12/1993
(Continued)

OTHER PUBLICATIONS

Jun. 10, 2014 Search Report issued in International Patent Application No. PCT/JP2014/062922.
(Continued)

*Primary Examiner* — Christopher E Garft
(74) *Attorney, Agent, or Firm* — Oliff PLC

(57) ABSTRACT

A vibration-damping support device including: an inner shaft member to be attached to a first connection target; upper and lower mount rubbers externally fitted onto the inner shaft member; and upper and lower restraining members bonded to the upper and lower mount rubbers respectively and configured to be superposed against the second connection target. The upper and lower restraining members are configured to project to a peripherally inside of an opening edge of a mounting hole of the second connection target so that the upper and lower restraining members overlap with each other as viewed in axial direction there. The lower mount rubber includes a slot extending annularly on its outer periphery and an inner peripheral convex part projecting inward from an inside of the slot so as to have a curved shape that is convex inward at the inside of the slot.

3 Claims, 3 Drawing Sheets

(51) Int. Cl.
 *B62D 33/06* (2006.01)
 *F16F 3/087* (2006.01)
 *F16M 13/02* (2006.01)

(58) Field of Classification Search
 USPC .......................................................... 248/634
 See application file for complete search history.

(56) References Cited

U.S. PATENT DOCUMENTS

| | | | |
|---|---|---|---|
| 8,668,213 B2* | 3/2014 | Takagi | B60G 15/067 280/124.145 |
| 2006/0202400 A1 | 9/2006 | Fitzgerald | |
| 2006/0255516 A1* | 11/2006 | Dickson | F16F 15/08 267/141.1 |

FOREIGN PATENT DOCUMENTS

| | | |
|---|---|---|
| JP | H10-141437 A | 5/1998 |
| JP | 2004-150596 A | 5/2004 |
| JP | 2004-291795 A | 10/2004 |
| JP | 2008-223794 A | 9/2008 |
| KR | 2008-0029518 A | 4/2008 |
| WO | 2006/091632 A2 | 8/2006 |

OTHER PUBLICATIONS

Jun. 10, 2014 Written Opinion issued in International Patent Application No. PCT/JP2014/062922.
Dec. 16, 2016 Office Action issued in Chinese Patent Application No. 201480066952.1.

\* cited by examiner

VIBRATION- DAMPING SUPPORT DEVICE

INCORPORATED BY REFERENCE

This is a Continuation of International Application No. PCT/JP2014/062922 filed on May 15, 2014, the disclosure of which including the specification, drawings and abstract is incorporated herein by reference in its entirety.

BACKGROUND OF THE INVENTION

1. Field of the Invention

The present invention relates to a vibration-damping support device for use in an automotive cab mount, a body mount, a sub-frame mount or the like, for example.

2. Description of the Related Art

Conventionally, there is known a vibration-damping support device interposed between connection targets that make up a vibration transmission system and providing vibration damping linkage therebetween, which is employed as a cab mount or the like, as disclosed in Japanese Unexamined Patent Publication No. JP-A-2004-291795. The vibration-damping support device includes an inner shaft member attached to a first connection target such as a cabin, an upper plate projecting peripherally outward from a first end of the inner shaft member, and an upper mount rubber disposed between opposed faces of a second connection target such as a vehicle frame and the upper plate. Moreover, with the vibration-damping support device, the inner shaft member is inserted into a mounting hole of the second connection target, and a lower plate projecting peripherally outward is provided to a second end of the inner shaft member on the opposite side from the first connection target, while a lower mount rubber is disposed between opposed faces of the second connection target and the lower plate. With the vibration-damping support device mounted to a vehicle, compression spring of the upper mount rubber and the lower mount rubber will support a load in the axial direction in a vibration damping manner.

Meanwhile, as disclosed in JP-A-2004-291795, in general, a rigid upper restraining member is bonded to the portion of the upper mount rubber to be superposed against the second connection target. The upper mount rubber is restrained by the upper restraining member on the side of superposition against the second connection target, thereby adjusting spring of the upper mount rubber or the like so as to realize desired supporting ability.

However, by superposing the upper restraining member and the second connection target, which are both rigid, with no bonding, a large input in the vertical direction sometimes causes relative displacement of the upper restraining member and the second connection target, generating noise due to rubbing. In particular, the inventor conducted researches and tests or the like, and found that the displacement of the upper restraining member relative to the second connection target is also caused by the lower mount rubber being subjected to a large compressive deformation in the axial direction and swelling so as to be inserted into the mounting hole of the second connection target, thereby pushing the upper restraining member and the upper mount rubber upward.

SUMMARY OF THE INVENTION

The present invention has been developed in view of the above-described matters as the background, and it is an object of the present invention to provide a vibration-damping support device with a novel structure which is able to limit relative displacement between the upper restraining member and the second connection target.

The above and/or optional objects of this invention may be attained according to at least one of the following modes of the invention. The following modes and/or elements employed in each mode of the invention may be adopted at any possible optional combinations.

Specifically, a first mode of the present invention provides a vibration-damping support device comprising: an inner shaft member configured to be attached to a first connection target; an upper plate projecting peripherally outward from a first end of the inner shaft member on a side of the first connection target; an upper mount rubber externally fitted onto the inner shaft member and configured to be disposed between opposed faces of a second connection target and the upper plate; a lower plate projecting peripherally outward from a second end of the inner shaft member, the second end being configured to project from a mounting hole of the second connection target to an opposite side from the first connection target with the inner shaft member inserted into the mounting hole; a lower mount rubber externally fitted onto the inner shaft member and configured to be disposed between opposed faces of the second connection target and the lower plate; an upper restraining member bonded to the upper mount rubber and configured to be superposed against the second connection target so as to project to a peripherally inside of an edge of an opening of the mounting hole; and a lower restraining member bonded to a portion of the lower mount rubber to be superposed against the second connection target, the lower restraining member being configured to overlap with the second connection target as viewed in axial direction, wherein the lower restraining member is configured to project to the peripherally inside of the edge of the opening of the mounting hole so that the lower restraining member and the upper restraining member overlap with each other as viewed in axial direction at the peripherally inside of the edge of the opening of the mounting hole.

With the vibration-damping support device according to the above first mode, the lower mount rubber is restrained by the lower restraining member. Therefore, even when the lower mount rubber gets compressed in the axial direction between the second connection target and the lower plate, it is possible to prevent the lower mount rubber from undergoing swelling deformation to the upper restraining member side through the mounting hole of the second connection target. This will prevent the upper restraining member from being pressed by the lower mount rubber through the mounting hole, thereby limiting displacement of the upper restraining member relative to the second connection target. Thus, stabilization of vibration damping characteristics and prevention of noises can be realized.

Moreover, the lower restraining member and the second connection target are configured to overlap with each other, while upper restraining member and the lower restraining member both project to the peripherally inside of the mounting hole so that the upper restraining member and the lower restraining member overlap with each other as viewed in axial direction at the peripherally inside of the mounting hole. This makes it possible to more effectively prevent the lower mount rubber from being pressed against the upper restraining member, thereby more advantageously limiting the amount of displacement of the upper restraining member relative to the second connection target.

A second mode of the present invention provides the vibration-damping support device according to the first mode wherein the lower mount rubber includes a slot that opens onto an outer peripheral surface thereof and extends annularly in a circumferential direction so as to make the lower mount rubber thin in an axis-perpendicular direction at an inner peripheral side of the slot, and an inner peripheral convex part that projects peripherally inward from the inner peripheral side of the slot so that the lower mount rubber has a curved shape that is convex peripherally inward at the inner peripheral side of the slot.

According to the second mode, through cooperation of the slot and the inner peripheral convex part, the lower mount rubber is provided with the portion which is thin and of a curved shape that is convex peripherally inward. With this arrangement, in the axial direction in which a problem of high dynamic spring behavior of the lower mount rubber tends to arise due to the lower restraining member being bonded, low spring will be achieved owing to a shear spring component of the curved shape portion.

A third mode of the present invention provides the vibration-damping support device according to the first or second mode, further comprising: an upper rubber layer configured to be disposed between superposed faces of the upper restraining member and the second connection target; and a lower rubber layer configured to be disposed between superposed faces of the lower restraining member and the second connection target.

According to the third mode, it is possible to prevent the rigid upper and lower restraining members from being directly superposed against the second connection target and to exhibit cushioning action owing to the rubber layer. This will reduce striking noises due to rubbing or striking.

A fourth mode of the present invention provides the vibration-damping support device according to any one of the first through third modes, further comprising a cushioning rubber provided between the lower restraining member and the inner shaft member.

According to the fourth mode, it is possible to prevent the lower restraining member from being directly in contact with the inner shaft member and to exhibit cushioning action owing to the cushioning rubber. This will avoid striking noises or the like during contact.

A fifth mode of the present invention provides the vibration-damping support device according to any one of the first through fourth modes wherein the upper restraining member includes an insertion part configured to be inserted into the mounting hole so as to overlap with the lower restraining member as viewed in axial direction.

According to the fifth mode, by the insertion part being inserted into the mounting hole, the upper restraining member is positioned with respect to the second connection target in the axis-perpendicular direction. Moreover, the insertion part configured to be inserted into the mounting hole overlaps with the lower restraining member as viewed in axial direction. This will prevent the lower mount rubber from being pressed against the insertion part, which is arranged close to the lower mount rubber, thereby making it possible to prevent the upper restraining member from undergoing displacement relative to the second connection target in the axial direction.

A sixth mode of the present invention provides the vibration-damping support device according to the fifth mode wherein the insertion part is covered by a covering rubber.

According to the sixth mode, the insertion part comes into contact with the inner surface of the mounting hole of the second connection target or the inner shaft member via the covering rubber, thereby avoiding noises due to rubbing or striking between the insertion part and the second connection target or the inner shaft member.

A seventh mode of the present invention provides the vibration-damping support device according to any one of the first through sixth modes wherein the upper restraining member and the lower restraining member are superposed so as to be remote from each other in the axial direction at the peripherally inside of the edge of the opening of the mounting hole.

According to the seventh mode, noises caused by rubbing or contact between the upper restraining member and the lower restraining member will be more effectively prevented. In particular, with the structure described in the third mode, relative displacement between the upper restraining member and the lower restraining member in the axial direction is permitted owing to elastic deformation of the rubber layer. Even in that case, by arranging the upper restraining member and the lower restraining member so as to be sufficiently remote from each other in advance, it is also possible to avoid contact between the upper restraining member and the lower restraining member.

According to the present invention, the lower restraining member limits deformation of the portion of the lower mount rubber to be superposed against the second connection target. This will prevent the lower mount rubber from being pressed against the upper restraining member through the mounting hole, thereby avoiding displacement of the upper restraining member relative to the second connection target. Furthermore, the lower restraining member is superposed against the second connection target, and the upper restraining member and the lower restraining member overlap with each other as viewed in axial direction at the peripherally inside of the edge of the opening of the mounting hole. This makes it possible to more effectively prevent the lower mount rubber from pressing against the upper restraining member.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

An embodiment of the present invention will be described below in reference to the drawings.

Figure 1:
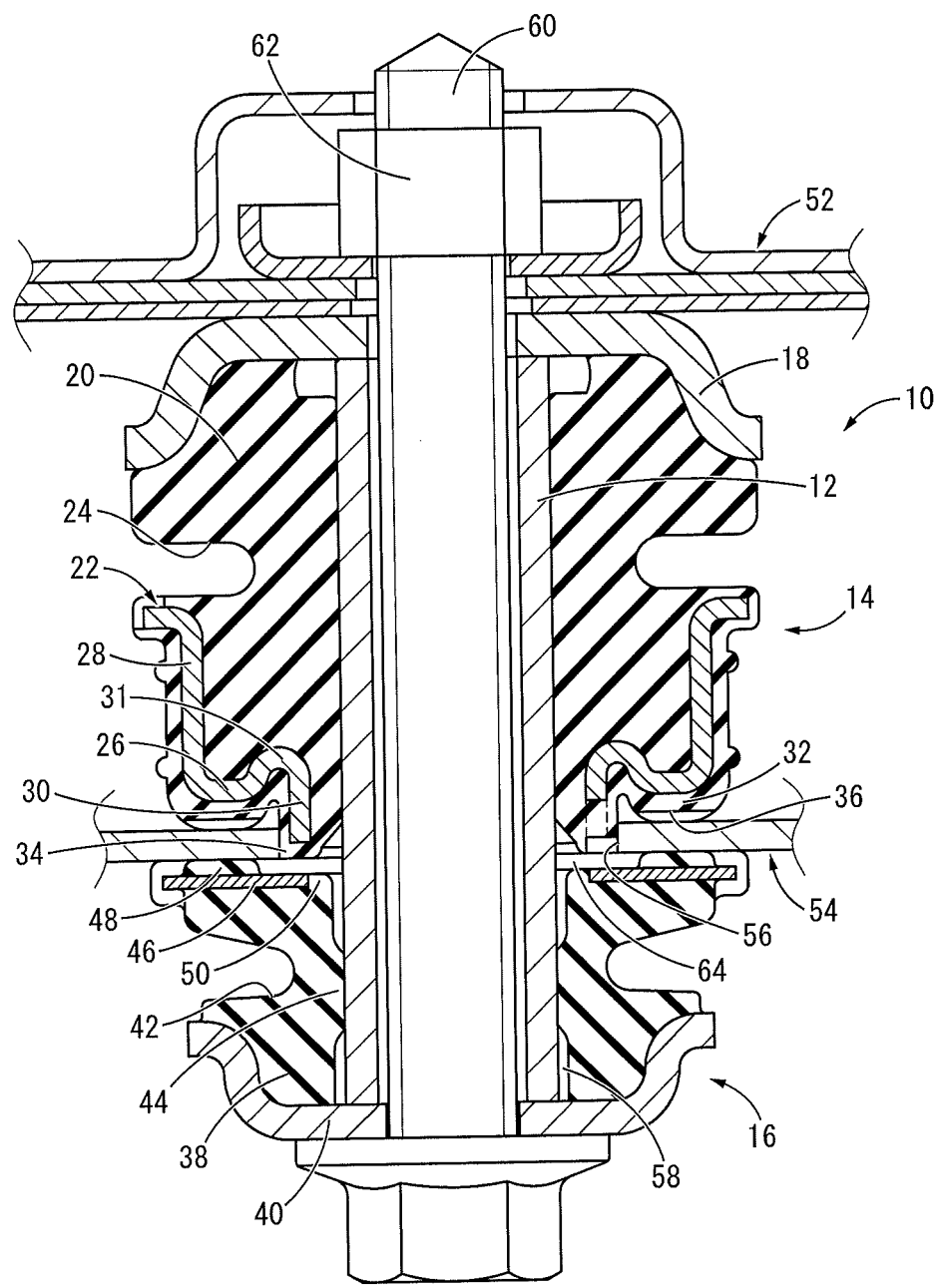
FIG. 1 is a vertical cross sectional view of a vibration-damping support device in the form of a cab mount as a first embodiment of the present invention, which is shown in a mounted state onto a vehicle.

Referring to FIG. 1, there is depicted an automotive cab mount 10 as a first embodiment of the vibration-damping support device constructed according to the present invention, which is shown in a mounted state onto a vehicle. The cab mount 10 includes an inner shaft member 12, and an upper mount 14 and a lower mount 16 each externally fitted onto the inner shaft member 12. In the description herein-below, the vertical direction refers to the vertical direction in FIG. 1, which substantially coincides with the vertical direction as the cab mount 10 is mounted onto the vehicle.

Described more specifically, the inner shaft member 12 is a high rigidity component formed of iron, aluminum alloy, or the like, and has a small-diameter, generally cylindrical shape. Besides, an upper plate 18 flaring peripherally outward is provided to the upper end, namely the first end, of the inner shaft member 12.

The upper plate 18 is a high rigidity component having a generally annular disk shape overall, with its inner peripheral portion being a flat plate shape that extends in the substantially axis-perpendicular direction while its outer peripheral portion being a tapered plate shape that downwardly slopes toward the outer peripheral side. The inner peripheral end of the upper plate 18 is superposed on the upper end face of the inner shaft member 12, and is fixed to the inner shaft member 12 by welding or the like. Note that the outer peripheral end of the upper plate 18 has a curved shape that is convex downwardly, and its outer peripheral end edge is disposed on the outer circumference without being in contact with an upper mount rubber 20 described later.

Figure 2:
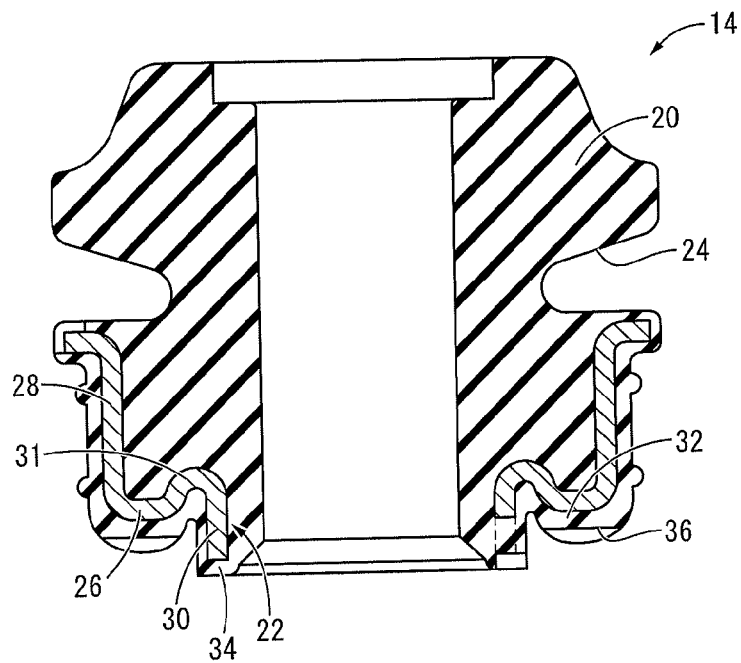
FIG. 2 is a vertical cross sectional view of an upper mount of the cab mount shown in FIG. 1.

Besides, the upper mount 14 is externally fitted onto the inner shaft member 12. As depicted in FIG. 2, the upper mount 14 has a structure in which an upper restraining member 22 is bonded by vulcanization to the upper mount rubber 20.

The upper mount rubber 20 is a rubber elastic body having a thick-walled, large-diameter, generally round tubular shape, and its axial upper end face has a shape that substantially corresponds to that of the lower face of the upper plate 18. Moreover, at the axial middle portion of the upper mount rubber 20, provided is an upper outer peripheral slot 24 that opens onto the outer peripheral surface of the upper mount rubber 20 and extends annularly in the circumferential direction. This makes the upper mount rubber 20 thin in the axis-perpendicular direction at the formation part of the upper outer peripheral slot 24.

The upper restraining member 22 is a rigid member formed of metal such as aluminum alloy, or synthetic resin or the like, and has a generally stepped round tubular shape overall. More specifically, the upper restraining member 22 includes a stepped part 26 at its axial middle portion, and further includes integrally a bonded part 28 of large-diameter tubular shape that projects upward from the outer peripheral end of the stepped part 26 and an insertion part 30 of small-diameter tubular shape that projects downward from the inner peripheral end of the stepped part 26. Besides, at the inner peripheral end of the stepped part 26, a bent part 31 having a cross section that is upwardly convex, generally semi-circular arc shape is provided about the entire circumference. The inner peripheral end of the bent part 31 is integrally connected with the insertion part 30.

The upper restraining member 22 is bonded to the lower part of the outer peripheral portion of the upper mount rubber 20, and in the present embodiment, the upper restraining member 22 is substantially embedded in the upper mount rubber 20. With this arrangement, the lower face of the stepped part 26 is covered by an upper rubber layer 32 integrally formed with the upper mount rubber 20, while the surface of the insertion part 30 is covered by a covering rubber 34 integrally formed with the upper mount rubber 20. Note that the inner peripheral end of the upper rubber layer 32 is depressed along the bent part 31 provided to the inner peripheral end of the stepped part 26, so that a free surface is considerably ensured, thereby achieving improvement of durability or adjustment of spring. Moreover, at the lower end portion of the upper rubber layer 32, formed are grooves 36 that extend in the radial direction at several locations along the circumference. By so doing, the air will flow between the inner peripheral side and the outer peripheral side of the upper rubber layer 32 through the grooves 36 with the upper rubber layer 32 being in contact with a frame 54 described later.

Figure 3:
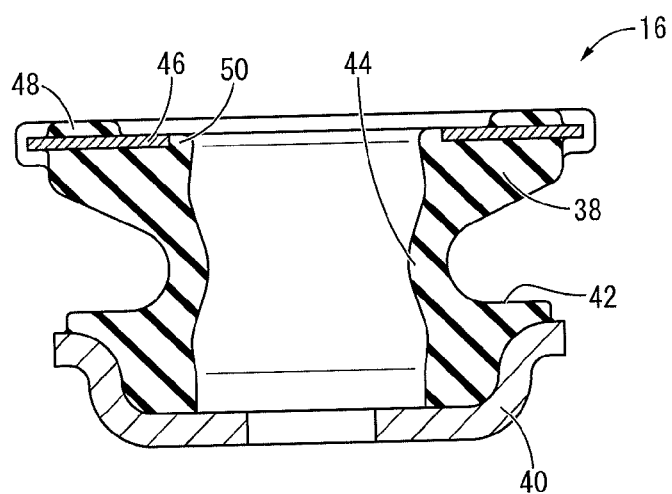
FIG. 3 is a vertical cross sectional view of a lower mount of the cab mount shown in FIG. 1.
Figure 4:
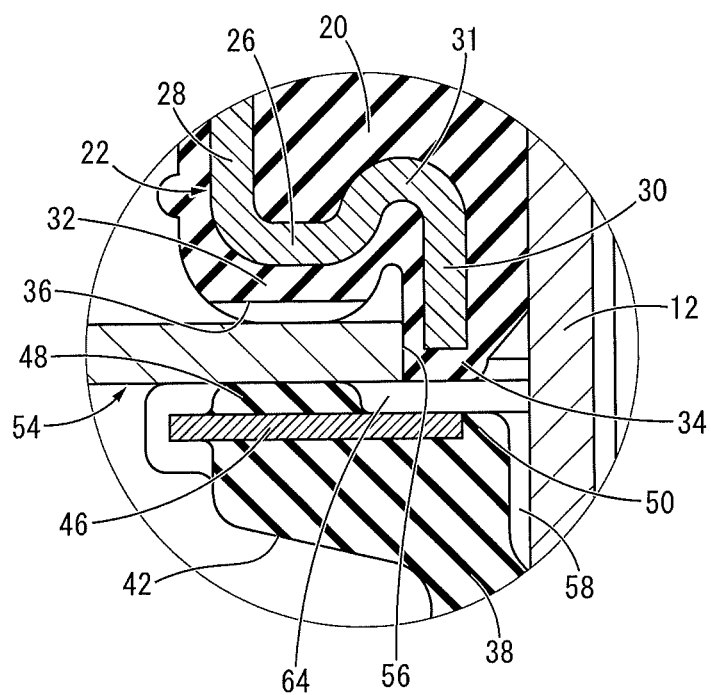
FIG. 4 is an enlarged partial cross sectional view of a principal part of the cab mount shown in FIG. 1.

Meanwhile, the lower mount 16 is externally fitted onto the inner shaft member 12. As depicted in FIG. 3, the lower mount 16 has a structure in which a lower plate 40 is bonded to a lower mount rubber 38.

The lower mount rubber 38 is a rubber elastic body having a thick-walled, large-diameter, generally round tubular shape. Moreover, at the axial middle portion of the lower mount rubber 38, provided is a lower outer peripheral slot 42 serving as a slot that opens onto the outer peripheral surface of the lower mount rubber 38 and extends annularly in the circumferential direction. This makes the lower mount rubber 38 thin in the axis-perpendicular direction at the formation part of the lower outer peripheral slot 42. The lower mount rubber 38 further includes an inner peripheral convex part 44 projecting peripherally inward from the inner peripheral side of the lower outer peripheral slot 42. The inner peripheral convex part 44 is formed on the inner peripheral surface of the lower mount rubber 38 in continuous fashion about the entire circumference, and projects inward in the axis-perpendicular direction. As shown in FIG. 3, when viewed in vertical cross section, the inner peripheral convex part 44 has a mountain cross section that gradually becomes narrow in the axial direction toward its projecting distal end side. Accordingly, as shown in FIG. 3, when viewed in vertical cross section, the axial middle portion of the lower mount rubber 38, where lower outer peripheral slot 42 and the inner peripheral convex part 44 are formed, has a curved shape that is convex peripherally inward, and the curved shape extends continuously about the entire circumference.

While no particular limitation is imposed as to a rubber material that forms the upper mount rubber 20 and the lower mount rubber 38, a self-lubricating rubber is preferably employed, and any of various self-lubricating rubbers known in the art can be employed, for example the ones disclosed in Japanese Unexamined Patent Publication No. JP-A-2008-223794. As a specific example, preferably employed are the ones for which a rubber material (base material rubber) such as NR, BR, IR, SBR, CR, NBR, EPDM, IIR, and blended polymers of these which have been typically used as a vibration damping rubber from the past contain silicone oil or the like as a lubricant. By employing such self-lubricating rubbers, even when the upper mount rubber 20 and the lower mount rubber 38 undergo elastic deformation due to vibration input in the state where the cab mount 10 is mounted onto the vehicle, described later, occurrence of noises caused by stick slip or the like will be avoided. Also, as a forming material of the mount rubbers 20, 38, an elastomer or the like that exhibits rubber-like elasticity is also employable. Moreover, the upper mount rubber 20 and the lower mount rubber 38 may be formed of the same material as each other, or may alternatively be formed of different materials from each other, according to differences in required characteristics.

The lower plate 40 is a high rigidity component like the upper plate 18, which has a generally annular disk shape overall. The inner peripheral portion of the lower plate 40 is a flat plate shape that extends in the substantially axis-perpendicular direction, while its outer peripheral portion being a tapered plate shape that upwardly slopes toward the outer peripheral side.

In addition, a lower restraining member 46 is bonded to the lower mount rubber 38. The lower restraining member 46 is a rigid member formed of metal, synthetic resin or the like, which has a generally annular disk shape, and is bonded to the upper end portion of the lower mount rubber 38. Besides, to the upper face of the outer peripheral portion of the lower restraining member 46, bonded is a lower rubber layer 48 integrally formed with the lower mount rubber 38. Furthermore, to the inner peripheral surface of the lower restraining member 46, bonded is a cushioning rubber 50 integrally formed with the lower mount rubber 38.

Note that the lower mount rubber 38 of the present embodiment takes the form of an integrally vulcanization molded component including the lower plate 40 and the lower restraining member 46. Also, the inner peripheral portion of the upper face of the lower restraining member 46 is exposed without being covered by the lower mount rubber 38 or the lower rubber layer 48.

The upper mount 14 and the lower mount 16 of the above construction are mounted onto the vehicle, as shown in FIG. 1, by the inner shaft member 12 being fixed to a cabin 52 serving as a first connection target, while a frame 54 serving as a second connection target being clasped between the upper mount 14 and the lower mount 16.

Specifically, by the inner shaft member 12 being inserted from above into a center hole of the upper mount rubber 20 that constitutes the upper mount 14 and the upper plate 18 of the inner shaft member 12 being superposed against the upper face of the upper mount rubber 20 in a state of contact, the upper mount 14 is externally fitted onto the inner shaft member 12. Moreover, the inner shaft member 12 to which the upper mount 14 is attached is inserted into a mounting hole 56 of the frame 54 and the lower portion of the inner shaft member 12 projects downward from the mounting hole 56. By so doing, the upper restraining member 22 of the upper mount 14 is superposed against the upper face of the frame 54 via the upper rubber layer 32, so that the upper mount rubber 20 is disposed between the upper plate 18 and the frame 54.

Furthermore, the lower mount rubber 38 of the lower mount 16 is externally fitted onto the lower portion of the inner shaft member 12 projecting from the mounting hole 56, and the lower end face of the inner shaft member 12 is superposed against the upper face of the inner peripheral end of the lower plate 40. By so doing, the lower restraining member 46 of the lower mount 16 is superposed against the lower face of the frame 54 via the lower rubber layer 48, so that the lower mount rubber 38 is disposed between the lower plate 40 and the frame 54. Note that the inside diameter dimension of the lower mount 16 is made larger than the outside diameter dimension of the inner shaft member 12, and the lower mount rubber 38 is in contact with the outer peripheral surface of the inner shaft member 12 at the formation part of the inner peripheral convex part 44. Meanwhile, a space 58 is formed between the lower mount rubber 38 and the inner shaft member 12 on the axial both sides of the inner peripheral convex part 44. Besides, the lower restraining member 46 overlaps with the frame 54 as viewed in axial direction.

Then, the upper plate 18 is superposed against the cabin 52 from below, and an attachment bolt 60 inserted into the inner shaft member 12 from a center hole of the lower plate 40 is threaded onto a nut 62 provided on the cabin 52 side. With this arrangement, the inner shaft member 12 is attached to the cabin 52, while the frame 54 is clasped between the upper mount 14 and the lower mount 16 in the axial direction, whereby the cabin 52 is elastically supported with respect to the frame 54 in a vibration damping manner. In such a mounted state onto the vehicle, the upper mount rubber 20 and the lower mount rubber 38 are subjected to pre-compression in the axial direction due to fastening by the attachment bolt 60 and the nut 62. Meanwhile, due to distributed load of the cabin 52, the upper mount rubber 20 is further pre-compressed in the axial direction, while the amount of pre-compression of the lower mount rubber 38 in the axial direction is reduced. Additionally, by the attachment bolt 60 being threaded onto the nut 62, the lower plate 40 is fixed to the lower end, namely the second end, of the inner shaft member 12.

Here, the cab mount 10 is configured such that relative displacement of the upper restraining member 22 and the frame 54 in the axial direction is limited with respect to a large load in the axial direction.

Specifically, with the cab mount 10 mounted onto the vehicle, the upper restraining member 22 of the upper mount 14 projects to the peripherally inside of the edge of the opening of the mounting hole 56, so that the insertion part 30 is inserted into the mounting hole 56. Moreover, the lower restraining member 46 of the lower mount 16 projects to the peripherally inside of the edge of the opening of the mounting hole 56. Accordingly, the insertion part 30 of the upper restraining member 22 and the lower restraining member 46 overlap with each other as viewed in axial direction at the peripherally inside of the edge of the opening of the mounting hole 56. In other words, the lower end face of the insertion part 30 of the upper restraining member 22 and the upper face of the inner peripheral end of the lower restraining member 46 are arranged in opposition to each other vertically in the axial direction.

Furthermore, the lower restraining member 46 is remote from the insertion part 30, which is covered by the covering rubber 34, downwardly in the axial direction, so that the lower restraining member 46 is superposed against the insertion part 30 with a gap 64 therebetween. In the present embodiment, the lower end of the insertion part 30 is positioned above the lower face of the frame 54 and is housed within the mounting hole 56 of the frame 54. Moreover, the lower face of the covering rubber 34, which covers the insertion part 30, does not project downward from the lower opening of the mounting hole 56 but is substantially flush with the lower face of the frame 54.

With this arrangement, when the cabin 52 undergoes displacement upwardly relative to the frame 54, and the lower mount rubber 38 is considerably compressed between the frame 54 and the lower plate 40 in the axial direction, swelling deformation of the lower mount rubber 38 in the axially upward direction is limited by the lower restraining member 46. This makes it possible to prevent the lower mount rubber 38 from being pressed against the upper restraining member 22 from below, thereby preventing the upper restraining member 22 from being pushed upward.

Moreover, the rigid lower restraining member 46 superposed against the frame 54 overlaps with the upper restraining member 22 as viewed in axial direction. Thus, displacement of the upper restraining member 22 relative to the frame 54 will be more reliably prevented. In this embodiment in particular, the insertion part 30, which is superposed against the lower mount 16 through the mounting hole 56 at the position away from the frame 54, overlaps with the lower restraining member 46 over the substantially entire lower end face thereof. Accordingly, displacement of the upper restraining member 22 relative to the frame 54 due to being pressed by the lower mount rubber 38 will be more effectively prevented.

Besides, the axial lower end of the upper mount 14 inserted in the mounting hole 56 of the frame 54 is placed so as not to project downward from the lower face of the frame 54. Therefore, even if the lower rubber layer 48 is considerably compressed due to input of a large load, the lower mount 16 is prevented from being pressed against the lower end face of the upper mount 14, thereby limiting upward displacement of the upper restraining member 22 relative to the frame 54. In the present embodiment in particular, since the lower end of the insertion part 30 is housed within the mounting hole 56, it is possible to prevent the upper restraining member 22 from being pushed upward due to contact between the lower restraining member 46 and the insertion part 30.

In addition, in the present embodiment, the lower face of the insertion part 30 covered by the covering rubber 34 is remote from the lower restraining member 46 downwardly in the axial direction with a gap 64 therebetween. This will avoid direct contact between the upper mount 14 and the lower mount 16, thereby more effectively prevent occurrence of noises.

In this way, by limiting relative displacement of the upper restraining member 22 and the frame 54 due to deformation of the lower mount rubber 38, noises caused by rubbing between the insertion part 30 of the upper mount 14 and the frame 54 or the like will be avoided. In particular, even if the covering rubber 34 arranged diametrically between the insertion part 30 and the frame 54 gets damaged or peeled off due to repeated load input for a long period of time, noises caused by direct rubbing between the upper restraining member 22 and the frame 54 will be prevented.

Additionally, in the present embodiment, the lower outer peripheral slot 42 opens onto the outer peripheral surface of the lower mount rubber 38, so that the lower mount rubber 38 is made thin at the formation part of the lower outer peripheral slot 42, while the axial middle portion of the lower mount rubber 38 has a curved cross sectional shape that is convex peripherally inward through cooperation of the lower outer peripheral slot 42 and the inner peripheral convex part 44. By so doing, with the lower mount rubber 38 where a problem of high dynamic spring behavior in the axial direction tends to arise due to shortening of its free length caused by the lower restraining member 46 being bonded, spring constant in the axial direction will be adjusted, so as to realize excellent ride comfort or the like owing to low dynamic spring in the axial direction.

Moreover, the cushioning rubber 50 bonded to the inner peripheral surface of the lower restraining member 46 is disposed between the lower restraining member 46 and the inner shaft member 12. Thus, during input of large load in the axis-perpendicular direction, the cushioning rubber 50 will reduce impact force caused by contact between the inner shaft member 12 and the lower restraining member 46, thereby decreasing striking noises.

Furthermore, the insertion part 30 of the upper restraining member 22 is inserted in the mounting hole 56 of the frame 54, and the outer peripheral surface of the insertion part 30 is juxtaposed against the inner peripheral surface of the mounting hole 56 in a state of contact via the covering rubber 34. Accordingly, the upper restraining member 22 is positioned with respect to the frame 54 in the axis-perpendicular direction.

An embodiment of the present invention has been described in detail above, but the present invention is not limited to those specific descriptions. For example, the specific shape of the upper restraining member is merely exemplary and shall not be limited in particular. That is, the bonded part 28 or the insertion part 30 is not an indispensable structure for the upper restraining member but is preferably provided.

Additionally, the specific shape of the lower restraining member shall not be limited in particular, either. As a specific example, it would also be possible to employ a lower restraining member of stepped, generally annular disk shape such that a step is formed at its radially middle portion and the inner peripheral portion thereof, which overlaps with the insertion part 30 of the upper restraining member 22 at the position where the mounting hole 56 opens, is positioned below the outer peripheral portion thereof. With this arrangement, even in the case where the upper restraining member 22 has a structure in which the insertion part 30 projects downward from the mounting hole 56, the upper restraining member 22 will be prevented from being pushed upward by the lower mount.

Also, in the preceding embodiment, the projecting part of the upper restraining member 22 that projects to the peripherally inside of the edge of the opening of the mounting hole 56 overlaps with the lower restraining member 46 substantially over its entirety as viewed in axial direction. However, the projecting part does not necessarily overlap with the lower restraining member 46 over its entirety. For example, the inner peripheral end of the upper restraining member 22 may be positioned to the inner peripheral side beyond the lower restraining member 46, or the upper restraining member 22 and the lower restraining member 46 may overlap with each other partially along their circumferences.

Besides, in the preceding embodiment, the upper rubber layer 32 and the covering rubber 34 integrally formed with the upper mount rubber 20, or the lower rubber layer 48 and the cushioning rubber 50 integrally formed with the lower mount rubber 38 are all not essential but can be omitted.

While in the preceding embodiment, the present invention has been shown reduced to practice in a cab mount, the present invention can also be implemented in vibration-damping support devices used as body mounts, sub-frame mounts, or the like. Moreover, the present invention is not limited to implementation in vibration-damping support devices used for automobiles, and is adaptable to implementation in vibration-damping support devices used for motorized two wheeled vehicles, rail vehicles, industrial vehicles, or the like.

What is claimed is:
1. A vibration-damping support device comprising:
an inner shaft member configured to be attached to a first connection target;
an upper plate projecting peripherally outward from a first end of the inner shaft member on a side of the first connection target;
an upper mount rubber externally fitted onto the first end of the inner shaft member and configured to be disposed between opposed faces of a second connection target and the upper plate;
a lower plate projecting peripherally outward from a second end of the same inner shaft member, the second end being configured to project from a mounting hole of the second connection target to an opposite side from the first connection target with the inner shaft member inserted into the mounting hole;

a lower mount rubber externally fitted onto the second end of the inner shaft member and configured to be disposed between opposed faces of the second connection target and the lower plate;

an upper restraining member bonded to the upper mount rubber and configured to be superposed against the second connection target so as to project to a peripherally inside of an edge of an opening of the mounting hole; and a lower restraining member bonded to a portion of the lower mount rubber to be superposed against the second connection target, the lower restraining member being configured to overlap with the second connection target as viewed in axial direction, wherein the lower restraining member is configured to project to the peripherally inside of the edge of the opening of the mounting hole so that the lower restraining member and the upper restraining member overlap with each other as viewed in axial direction at the peripherally inside of the edge of the opening of the mounting hole, the lower mount rubber includes a slot that opens onto an outer peripheral surface thereof and extends annularly in a circumferential direction so as to make the lower mount rubber thin in an axis-perpendicular direction at an inner peripheral side of the slot, and an inner peripheral convex part that projects peripherally inward from the inner peripheral side of the slot so that the lower mount rubber has a curved shape that is convex peripherally inward at the inner peripheral side of the slot, an upper rubber layer is disposed between superposed faces of the upper restraining member and the second connection target, and a lower rubber layer is disposed between superposed faces of the lower restraining member and the second connection target, the upper restraining member includes an insertion part configured to be inserted into the mounting hole so as to overlap with the lower restraining member as viewed in axial direction, and the insertion part is covered by a covering rubber so that the insertion part comes into contact with an inner surface of the mounting hole of the second connection target via the covering rubber, the lower plate is bonded to an axially lower end portion of the lower mount rubber, and the lower restraining member is bonded to an axially upper end portion of the lower mount rubber, while the slot is formed at an axially middle portion of the lower mount rubber axially disposed between the lower restraining member and the lower plate, the upper restraining member has a stepped round tubular shape including a stepped part at its axial middle portion, and the upper restraining member includes a bonded part of large-diameter tubular shape that projects upward from an outer peripheral end of the stepped part, the insertion part of small-diameter tubular shape that projects downward from the inner peripheral end of the stepped part, and a bent part having a cross section that is upwardly convex with an inner peripheral end connected with the insertion part, and the upper restraining member is embedded in a lower part of the upper mount rubber such that a lower face of the stepped part is covered by the upper rubber layer integrally formed with the upper mount rubber, and that the upper rubber layer is depressed along the bent part to provide a depressed part, and a lower end portion of the upper rubber layer is formed with a groove extending in a radial direction so that air flows between an inner peripheral side where the depressed part is formed and an outer peripheral side of the upper rubber layer through the groove with the upper rubber layer being in contact with the second connection target.

2. The vibration-damping support device according to claim 1, further comprising a cushioning rubber provided between the lower restraining member and the inner shaft member.

3. The vibration-damping support device according to claim 1, wherein the upper restraining member and the lower restraining member are superposed such that the upper restraining member and the lower restraining member are remote from each other in the axial direction at the peripherally inside of the edge of the opening of the mounting hole.

* * * * *